Nov. 28, 1967   J. C. LUCAS   3,354,616
METHOD AND APPARATUS FOR LOADING AND UNLOADING
A FILTER FOR RADIOACTIVE GASES
Filed Nov. 20, 1964   9 Sheets-Sheet 1

*INVENTOR*
Jean Claude Lucas

BY Bauer & Seymour
ATTORNEYS

*INVENTOR*
Jean Claude Lucas

INVENTOR
Jean Claude Lucas

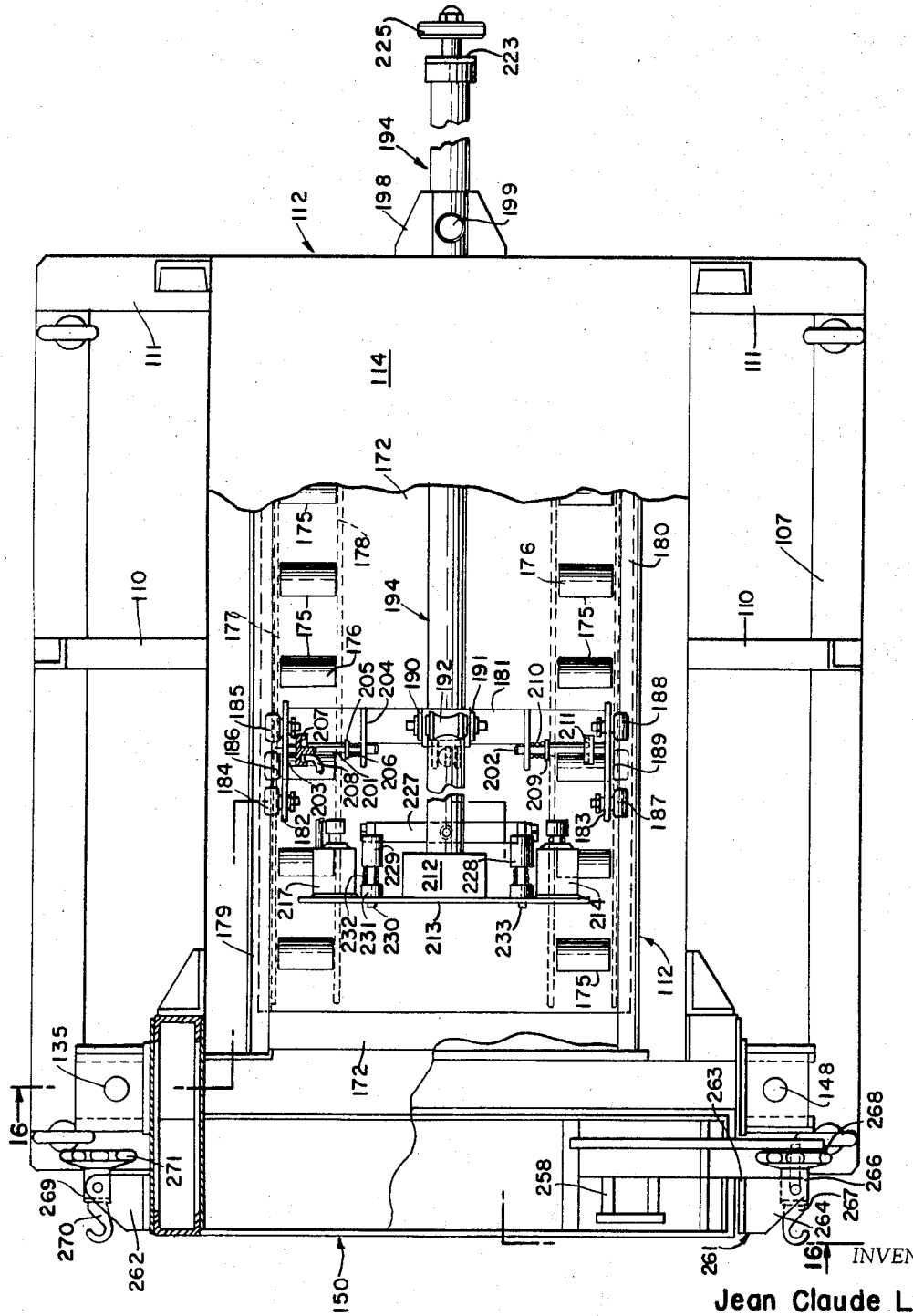

United States Patent Office 3,354,616
Patented Nov. 28, 1967

3,354,616
METHOD AND APPARATUS FOR LOADING AND UNLOADING A FILTER FOR RADIOACTIVE GASES
Jean Claude Lucas, Fontenay-aux-Roses, France, assignor to Saint-Gobain Nucleaire, Courbevoie, France
Filed Nov. 20, 1964, Ser. No. 412,723
35 Claims. (Cl. 55—96)

This invention relates to the filtering of fluids, especially gases containing radioactive substances. More specifically, the invention relates to a method of and apparatus for the efficient loading into a filter caisson or casing, of renewable filter elements or cartridges, and the safe removal from the caisson and subsequent disposal of spent filter elements.

The requirements for the safe removal from a caisson, of spent filter elements, and their subsequent transportation to a place of disposal, are severe. After a period of use depending upon the particular fluid or gas being filtered, its rate of flow, and other variables, the efficiency of a filter element becomes reduced to a point which requires its replacement with a new element. The spent unit is contaminated with radioactive accretions which give off rays physiologically harmful so that it must be handled entirely by remote control and carefully shielded during its removal from the caisson. Likewise the interior of the caisson must be shielded while unloading and loading are proceeding, so that no harmful rays can escape.

Ancillary to the requirements just stated, in order that neither the spent filter element nor the interior of the caisson shall be exposed, even momentarily, it is also required that the new or replacement filter element be likewise shielded during its emplacement within the caisson.

It is the chief purpose and object of this invention to provide a method of and apparatus for the certain and safe emplacement of filter units within a caisson and by which, in an equally safe and certain way, contaminated, spent filter units may be withdrawn and conveyed to a place of safe disposal, all without danger to operating personnel.

Another object is to provide a filter casing which, in furtherance of the general object of the invention, makes removal of a contaminated filter unit facile, rapid and certain, while effecting gas-tight seal between a newly emplaced filter unit and the inlet and outlet conduits of the caisson.

Yet another object is to provide a novel shielding wall in position before the loading opening in the caisson and which is provided with an opening having a slidable door impervious to radiation and which has means by which a flexible container or sack for the filter unit may be detachably secured over and about the opening during withdrawal of a used filter unit and the emplacement into the casing of a new unit.

Still another object is to provide a shielded vehicular housing or container which cooperates with the aforesaid wall to positively colocate a loading opening in the shielding of the housing and the loading opening in the wall of the caisson, whereby a used filter unit may be directly withdrawn from the caisson into the housing and the latter with contained contaminated filter unit, moved to a place of safe disposal.

Another object is to provide in conjunction with the vehicular container just mentioned, mechanism by which the used filter unit may be engaged and drawn from the caisson into the vehicular housing for disposal, while encased in its enclosure sack, and by which a new encased unit may be emplaced within the caisson.

Yet another object is to provide a novel form of sack of material resistant to passage of radioactive emanations and which enables disposal of all radioactive material and objects used in connection with the operation of recharging the caisson.

A further object is to provide a highly useful apparatus by which a spent filter unit may be engaged, translated smoothly out of the caisson, directly into the vehicular container, while being continuously effectively shielded against emanation of radioactive rays into ambient space.

The foregoing and other objects and advantages are attained by mechanism shown in the accompanying drawings wherein:

FIGURE 17 is a horizontal plan view with parts of the shielding broken away to show internal construction of the conveyance;

Figure 1:
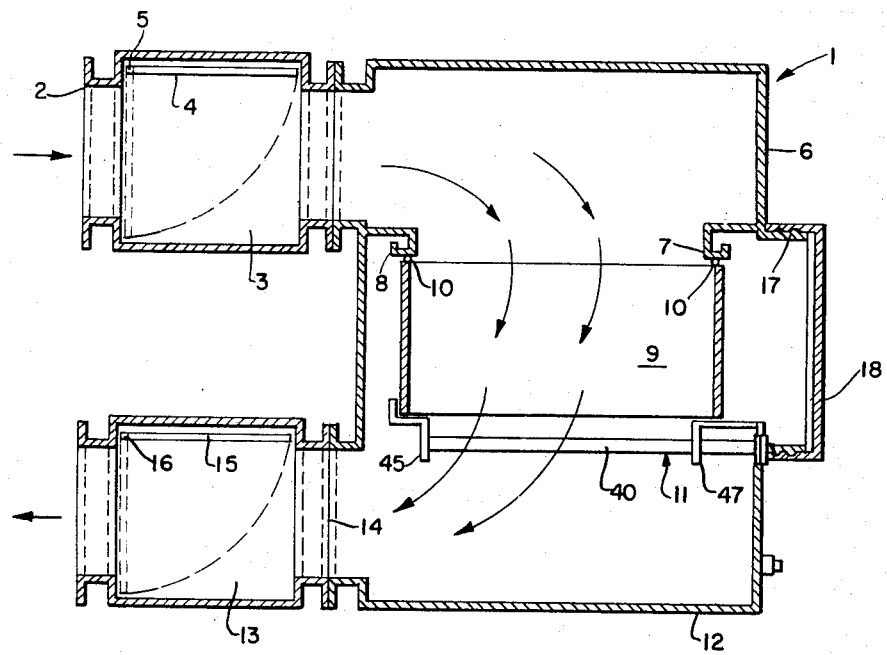
FIGURE 1 is a central vertical section showing schematically one form of filter casing with a filter unit operatively positioned therein.

Referring in detail to FIGURE 1, 1 identifies generally a filter casing which may be parallelepipedal in form and constructed of sheet metal. Gas to be filtered enters through flanged coupling 2, passes horizontally through a damper section 3 having therein a damper 4 swingable about a horizontal axis 5 normal to the plane of the figure, from the position shown in full lines to the fully closed position indicated in dotted lines. From damper section 3 gas passes horizontally into the upper portion 6 of casing 1. The bottom wall of this portion has an opening 7 which may be square or rectangular and which is provided with a lip channel-shaped in cross section as indicated at 8, to provide a planar surface affording a gas-tight joint with the filter unit or element 9.

Unit 9 is shown as parallelepipedal, closed on all four sides and open at its top and bottom and, of course, containing known filtering materials. The top edges of the filter walls are provided with any suitable form of resilient packing strips 10 so that when filter unit 9 is forced upwardly by mechanism generally identified at 11, the unit makes a gas-tight joint with the casing at 8.

The lower portion of casing 1 is indicated at 12 and is in open communication with the open bottom of the filter unit so that after traversing the unit, the filtered gas passes as indicated by the arrows, to an outlet damper section 13 connected by flanged coupling 14 with lower section 12 and including damper 15 swingable about horizontal axis 16 from the open position shown to a fully closed position as indicated by dotted lines.

The front vertical wall of caisson 1 is provided with a forwardly protruding flange 17 which, for convenience, may be circular, oval or elliptical, and provided with circumferential corrugations as shown. A cover or cap 18 fits snugly over and about flange 17.

Due to the radioactive interior of the caisson no direct open exposure thereof is permissible. The caisson itself is shielded by a vertical wall of lead, subsequently described in detail. The filter element itself, as produced, is enclosed in a bag or sack, FIGURE 2, of polyvinyl chloride and is generally identified at 19, FIGURES 2 through 9. From FIGURE 5 in particular it is noted that the bag has an opening adapted for a smooth fit over and about flange 17 of the caisson. Preferably also, the bag has an auxiliary depending pouch 20 in communication with the sack and so positioned that when the opening or mouth of the sack is located over and about flange 17, the pouch depends therefrom closely beneath the caisson opening. During use of a filter element within the caisson, its sack remains in position over and about flange 17 in gas-tight relation therewith. After a new element has been inserted into the caisson and elevated into gas-tight relation with opening 7, the sack in which it was enclosed is simply rolled into compact form and inserted into the space defined by flange 17, after which cover 18 is replaced.

Figure 2:
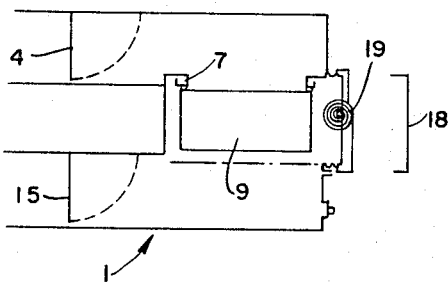
FIGURE 2 is a schematic view showing a used or spent element within the caisson and about to be withdrawn for replacement by a new element.
Figure 3:
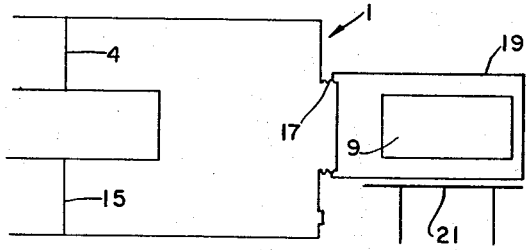
FIGURE 3 shows the spent filter unit fully withdrawn and encased within its sack.
Figure 4:
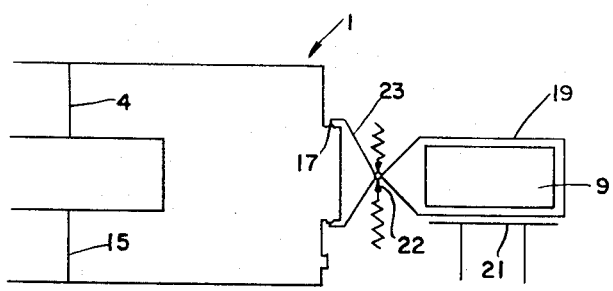
FIGURE 4 shows the step of welding and severing the sack along the area of welding.

FIGURE 2 shows schematically a used filter element about to be replaced and with its sack in rolled condition. Dampers 4 and 15 have been closed and cover 18 has been taken off flange 17. FIGURE 3 shows schematically a mobile support 21 which has been moved up before cover 18, in position to receive the used filter element; and from this figure it is noted that the element is withdrawn without removal of its sack from flange 17.

After the filter element has been withdrawn and rests upon support 21, the sack is pressed and welded, as by heat, at a location between the element and flange, and then sheared along a line which leaves the element fully sealed, as well as that portion remaining about the flange. This step is illustrated schematically upon FIGURE 4, where the area of weld is identified at 22. The portion of the sack remaining about flange 17 is indicated at 23, FIGURES 4 and 5.

Figures 5, 6:
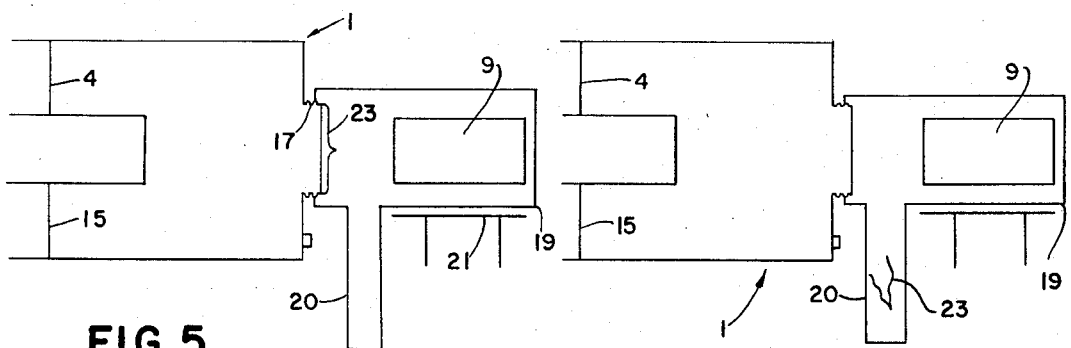
FIGURE 5 illustrates a new filter unit supported in its sack before the caisson opening, about to be translated into the caisson.
FIGURE 6 shows the step of disposal of the cut portion of the previously-used sack.

In FIGURE 5 the used filter has been removed and a new unit with sack 19 has been moved up into position before caisson opening flange 17. The cut portion 23 of the previous filter element is drawn back slightly on, but without removal from the flange. The new or replacement sack is extended with its pouch 20 depending therefrom, and its opening is fitted over and about flange 17 and the portion 23 remaining of the sack of the element just removed.

Figure 7:
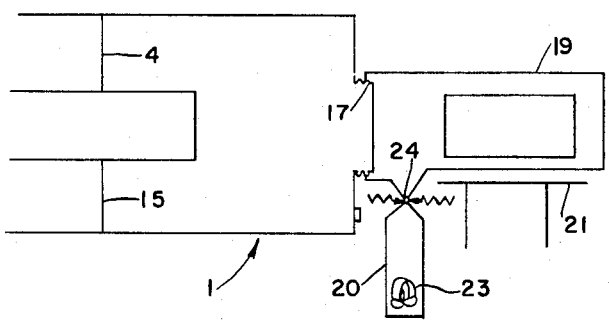
FIGURE 7 illustrates heat sealing and severing of the pouch containing the cut portion of the previous sack.

Next, as shown upon FIGURE 6, the contaminated portion 23 is pulled off flange 17 and deposited into pouch 20, after which the pouch is sealed as indicated at 24, FIGURE 7. The pouch with portion 23 therein is then severed along the line of sealing to thereby leave new sack 19 fully sealed as well as the cut portion of the pouch. The latter is then removed and discarded.

Figure 8:
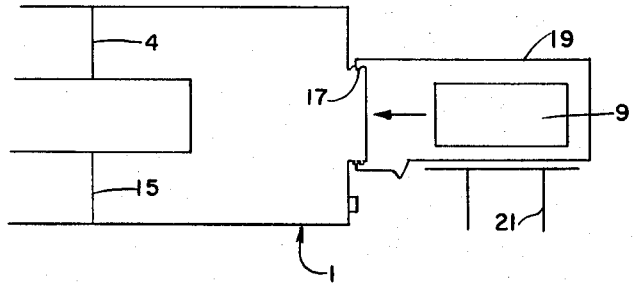
FIGURE 8 shows the new filter unit ready for movement into the caisson.
Figure 9:
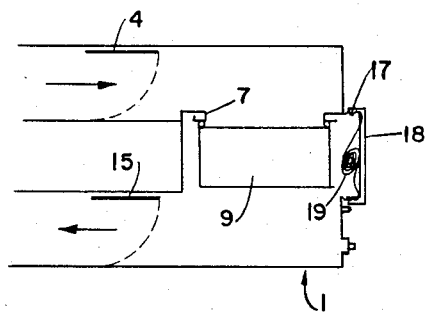
FIGURE 9 depicts the new unit in operating position, its sack rolled and the caisson cover replaced.

As indicated upon schematic FIGURE 8, the new element 9 is next translated horizontally through the caisson opening into position therewithin. The element is raised into gas-tight contact with opening 7 as shown upon FIGURES 1 and 9, sack 19 is rolled into the space defined by flange 17 without removal therefrom, and cover 18 is replaced and secured in position. After opening dampers 4 and 15 the caisson is ready to be placed on stream.

The foregoing explains the general procedure and method; and it will be noted that at no time is there any open exposure of the used filter unit, the new unit, or the cut portion of the used sack secured about flange 17.

Figure 10:
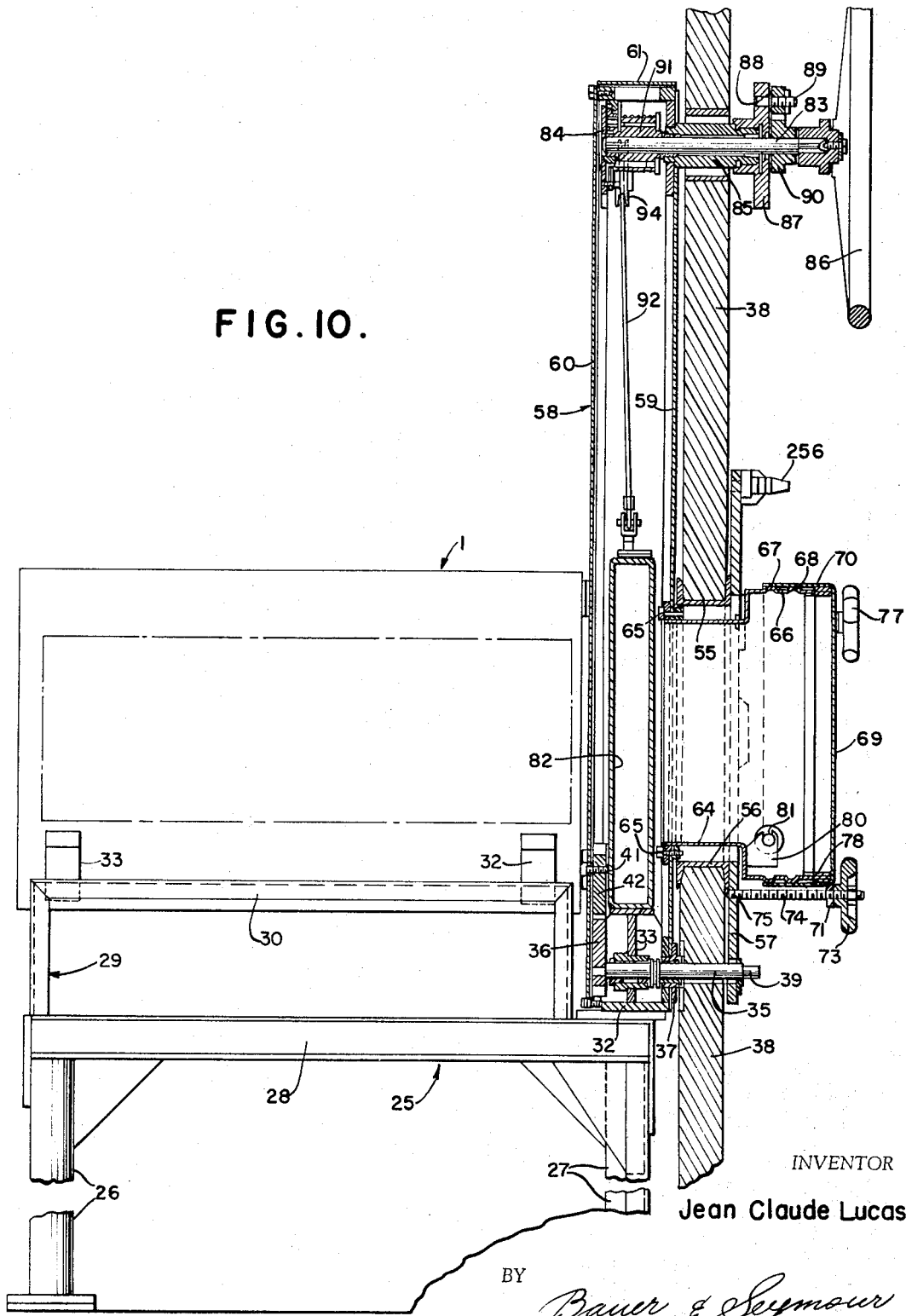
FIGURE 10 is a detail longitudinal vertical cross section of the caisson, its support, shielding wall and door operating means for the loading opening in the wall, taken in planes identified by the broken line 10—10, FIGURE 12.

The shielding wall for the caisson has been previously mentioned and is shown upon FIGURE 10. Referring in detail to this figure, the caisson or filter casing 1 is shown supported by a built-up metal framework or table 25 shown to consist of four legs such as 26, 27, cross beams 28, etc., all rigidly united. A frame generally identified at 29 surmounts the table. This frame includes two spaced, longitudinally extending, horizontal tracks 30, 31, FIGURES 10 and 11. The caisson casing 1 fits between these tracks and has brackets or roller means such as 32, 32a welded or otherwise fixed to each side wall, to rest on the aforesaid tracks so that the entire caisson may be translated on and along these tracks for removal, repair and replacement.

Figure 11:
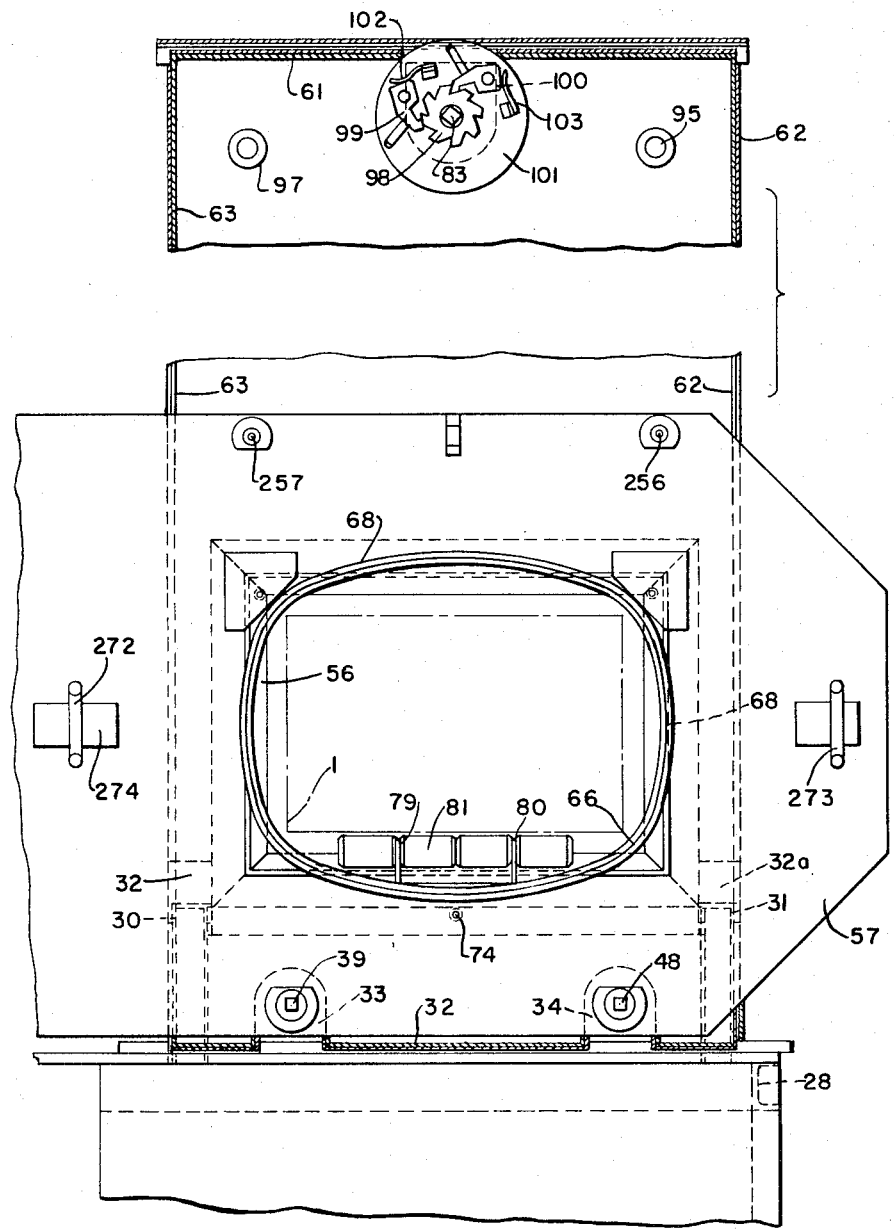
FIGURE 11 is a front elevation of the shielding wall with cover removed.

Mechanism previously mentioned is provided within the caisson for supporting and vertically translating the filter unit into gas-tight relation with opening 7 therein, as shown schematically upon FIGURE 1. Referring more particularly to FIGURES 10 and 11, a horizontal flat plate 32 is fixed to and across the front end of the two beams 28 and has a pair of transversely spaced bearing brackets 33 and 34 secured thereto, as by welding. The general position and spaced relation of these brackets is shown upon FIGURE 11. Since they are allochiral duplicates a description of bracket 33 will be sufficient. From FIGURE 10 it is noted that bracket or mount 33 journals a stub shaft 35 having a reduced squared rearward end on which a gear segment 36 is fixed. The shaft extends forwardly of its bearing, through a gland 37 and a bushing in shielding wall 38, of lead, and has a reduced squared forward end 39 to receive a correspondingly shaped aperture in one end of a crank, not shown.

Figure 13:
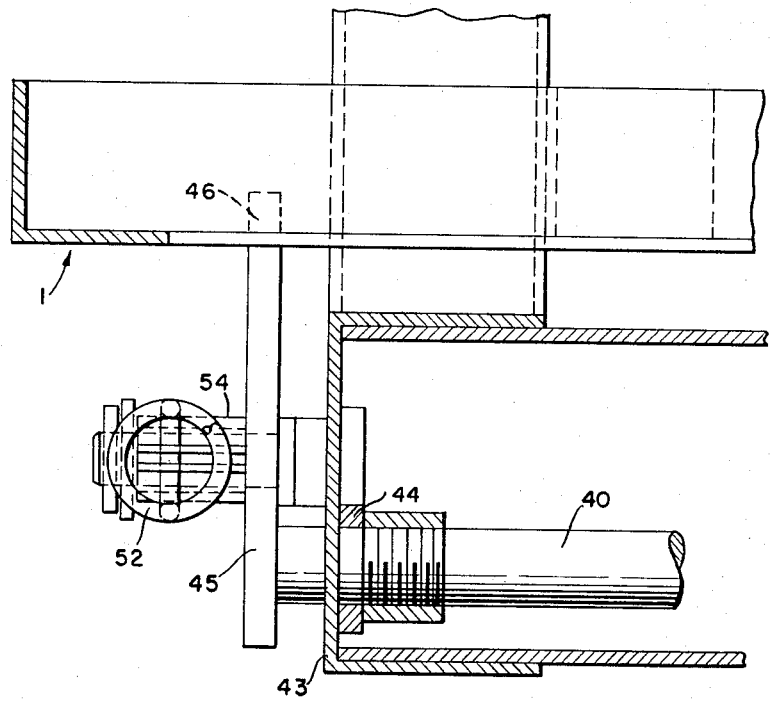
FIGURE 13 is a detail view partly in section, of one of the shafts and a cam thereon for elevating the filter unit into operating position.
Figure 14:
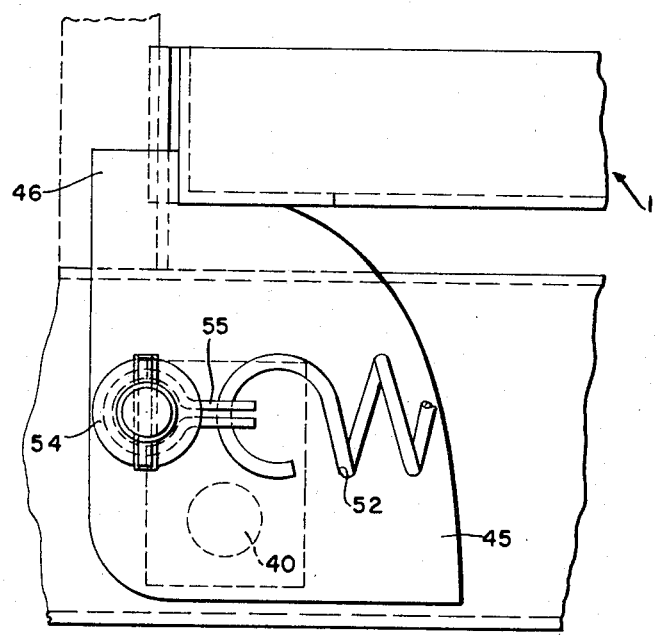
FIGURE 14 is a view corresponding to FIGURE 13, looking from left to right and showing the cam in elevating position.

A shaft 40 journaled in caisson 1 has a forward projecting squared end 41, FIGURE 10, on which is fixed a second gear sector 42, in mesh with sector 36. The shaft extends substantially the full length of the caisson and is journaled in apertures in frame 43, as indicated for example at 44, FIGURE 13. Shaft 40 has two identical cams fixed thereon, at the front and rear portions of the caisson, respectively. Referring to FIGURES 13 and 14, the rear cam 45 is shown to be in the general form of an arcuate quadrant except that, as viewed upon FIGURE 14, the horizontal radial distance from the axis of shaft 40 is less than the vertical distance. Also the cam has an abutment 46 which in a way obvious from FIGURE 14, acts to limit clockwise rotation thereof in the position shown. Shaft 40 and its front and rear cams 45 and 47 also appear upon FIGURE 1.

Figure 12:
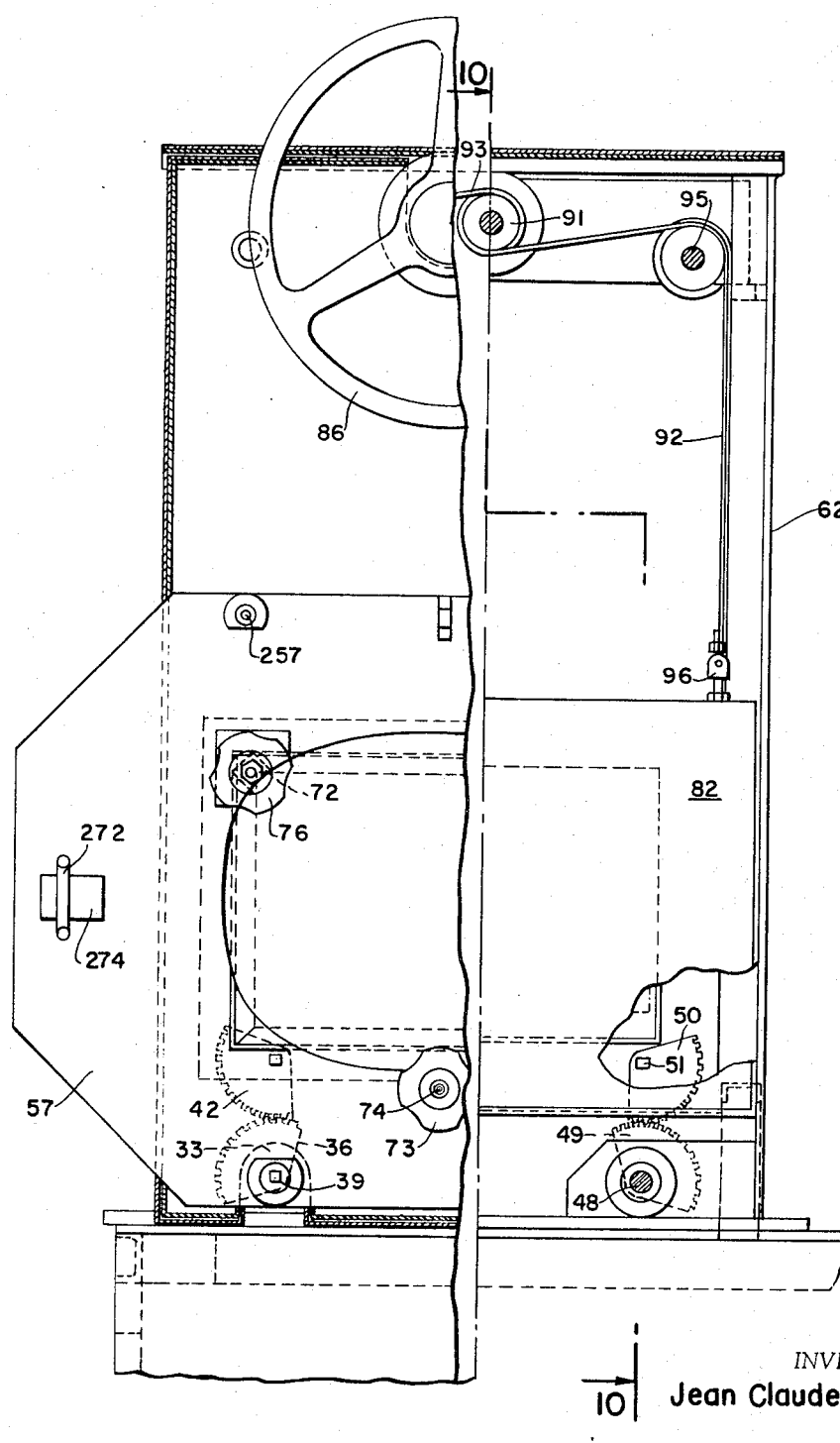
FIGURE 12 is a front elevation with wall portions broken away to more clearly illustrate details of the filter unit control mechanism and means for elevating the loading door forming an element of the shielding wall.

From FIGURE 12 it is seen that gear sectors 36 and 42 are mounted at the left side of the caisson. The structure described, including shaft 40 and cams 45 and 47, is duplicated at the right side of and within the caisson, so that, referring to FIGURE 12, it will be sufficient to identify shaft 48, gear sectors 49, 50 and the squared end of shaft 51. The two rear cams of which cam 45 only is shown, are interconnected by a coil spring 52 having its looped ends connected with the respective rear cams. Thus, referring to FIGURES 13 and 14, a cap screw threaded into an aperture in cam 45 has a sleeve 54 journaled for free rotation thereon. The sleeve includes an offset eye 55 into which the corresponding end of spring 52 is hooked. The other end of the spring is similarly secured to the other rear cam.

The position of the cap screws on the respective cams is such that when the cams are in the raised position of FIGURE 14, spring 52 acts to yieldingly hold them in such position. Likewise as the two cam shafts are reversely rotated the line of action of the spring passes below the plane defined by the axes of shafts 40 and 51 so that the spring then acts to hold the cams in lowered position. Thus, as shafts 42 and 48 are turned, as by a crank positioned upon their forwardly exposed, squared ends, their cams within the caisson act to vertically translate the filter unit between an elevated position wherein the unit is in gas-tight seal with caisson opening 7, and a lowered position wherein the filter element may be freely horizontally translated through the door opening in the caisson and shielding wall.

The lead shielding wall generally identified at 38 has been previously mentioned and is shown upon FIGURE 10, space a little forwardly of the caisson. The wall has a loading opening 55 generally oval in shape and framed by a channel 56 to which is rigidly affixed a forward plate 57 having a similarly shaped opening for a purpose subsequently explained.

In the space between the front end of the caisson and the shielding wall there is disposed a sheet metal enclosure generally identified at 58. Reference to FIGURES 10 and 11 shows that this enclosure comprises front vertical wall 59, rear vertical wall 60, top wall 61, and right and left side walls 62, 63. The lower edges of the front, rear and side walls terminate at and may be secured to plate 32, previously described. Front and rear walls 59, 60 are provided with rectangular openings aligned with the front opening in the caisson and shielding wall.

The opening in front wall 59 has a sheet metal cover support 64 secured to its peripheral edge as by flange bolts 65. The support extends forwardly through and in spaced relation with frame 56 in shielding wall 38 and expands forwardly thereof into an oval wall 66 having horizontally spaced corrugations 67 and 68. An oval cover 69 includes an integral skirt 70 shaped for a smooth fit over and about the aforesaid corrugations. It will be understood that this cover is similar to cover 18 previously described in connection with FIGURE 1, but that FIGURE 1 is schematic only for the purpose of explaining the general method and procedure.

Cover 69 is equipped with three forked brackets fixed thereto. One of these is identified at 71, FIGURE 10. Bracket 71 is located at the center of the bottom edge of the cover. The other two, of which 72 is shown upon FIGURE 12, are located respectively at the upper left and right corners of the cover. Reverting to bracket 71, FIGURE 10, a handwheel 73 is fixed to the end of bolt 74, extending through the fork of bracket 71 and having its other end threaded into an aperture 75 in plate 57. The other two brackets are similarly equipped. Handwheel 76 for bracket 72 is shown upon FIGURE 12. The upper right handwheel appears at 77, FIGURE 10.

Thus, with cover 69 in place, turning down of handwheels 73, 76 and 77 operates to compress packing ring or gasket 78, secured to and extending about the inner periphery of the cover, into gas-tight seal with the forward edge of wall 66. Forked roller brackets 79 and 80, FIGURE 11, are fixed to the forward extension wall of support 64 and journal between them a removable roller in position to engage and support a filter unit in its translation into and out of the caisson.

A rectangular lead shielding door 82 is positioned within enclosure 58, for vertical translation from a lowermost position wherein it rests on supports integral with bearing brackets 33 and closes the loading openings in the caisson and shielding wall, as depicted upon FIGURE 10, to an upper or raised position free of these openings. Support and movement of the door between the two positions is effected by a mechanism shown upon FIGURE 10, to consist of a main shaft journaled in bearings 84, 85 carried by the walls of enclosure 58 and extending through an aperture in wall 38. At its forward end, shaft 83 has a handwheel 86 affixed thereto. A circular flange 87 fixed to the forward end of sleeve bearing 85 has an aperture 88 to receive a locking pin 89. A collar 90 fixed to the shaft 83 mounts pin 89 for sliding into and out of aperture 88 to lock the shaft and thereby secure door 82 in a selected position of vertical adjustment. From FIGURE 11 it is noted that the shaft 83 is located at the top center of enclosure 58.

At its end within the enclosure, shaft 83 has a winding drum 91 fixed thereto and to which are attached one end of each of two cables 92, 93, FIGURES 10 and 12. Cable 92 extends from drum or sheave 91, horizontally to the right as viewed in FIGURE 12, over and about a pulley 94 journaled on shaft 95 at the upper right inside of the enclosure or casing, thence downwardly where its other end is attached at 96 to the top edge of door 82. The other cable 93 extends leftwardly from drum 91 to and about a second pulley not shown but identical with pulley 94. The shaft of this second pulley is identified at 97, FIGURE 11, from whence the cable extends downwardly for attachment to door 82 at the other end of its top edge. Thus turning of handwheel 86 effects vertical translaion of door 82 beween its open and closed positions.

Referring more particularly to FIGURE 11, a ratchet wheel 98 is fixed to shaft 83. A pair of pawls 99, 100 are pivoted to an escapment wheel 101 at positions about the wheel equal to an integer plus one-half, of the angular spacing of the ratchet teeth, so that, as shown, when one pawl is fully engaged between two teeth the other is midway between two teeth. Leaf springs 102, 103 urge the pawls into engagement with the wheel.

Wheel 101 is mounted for limited angular movement. The means for accomplishing this may be simply a pin fixed to the wheel and two angularly spaced abutments, not shown. As is clear from FIGURE 11, the top portion of the periphery of the wheel is exposed so that it may be oscillated in any way, as by a lever inserted into a radial hole therein, to allow ratchet wheel 98 to rotate step by step and allow door 82 to descend of its own weight. Pin 89 allows the door to be secured in a selected position of elevation. Thus, by loosening and removing handwheels 73, 76 and 77, cover 69 may be taken off. Then when handwheel 86 is turned to elevate door 82 to its full height the filter unit within caisson 1 is exposed for removal.

Conveyance means for delivering a fresh filter unit to the caisson and for removing an exhausted one therefrom have been described and schematically illustrated at 21, FIGURES 3 through 8. The conveyance is an important feature of the invention. Since it must include a lead-sheathed container for the used or spent unit, it must be sturdily constructed, carefully coordinated with the caisson and the loading doors and cover thereof. At the same time the conveyance must incorporate remote control mechanism for extension into the caisson to be coupled with the used filter unit therein, and operable to withdraw the unit, within its sack, into the container. Since the door of the container must also be of lead, means are provided to guide the door in vertical translation between its open and closed positions, together with high-leverage means for effecting such translation.

Figure 15:
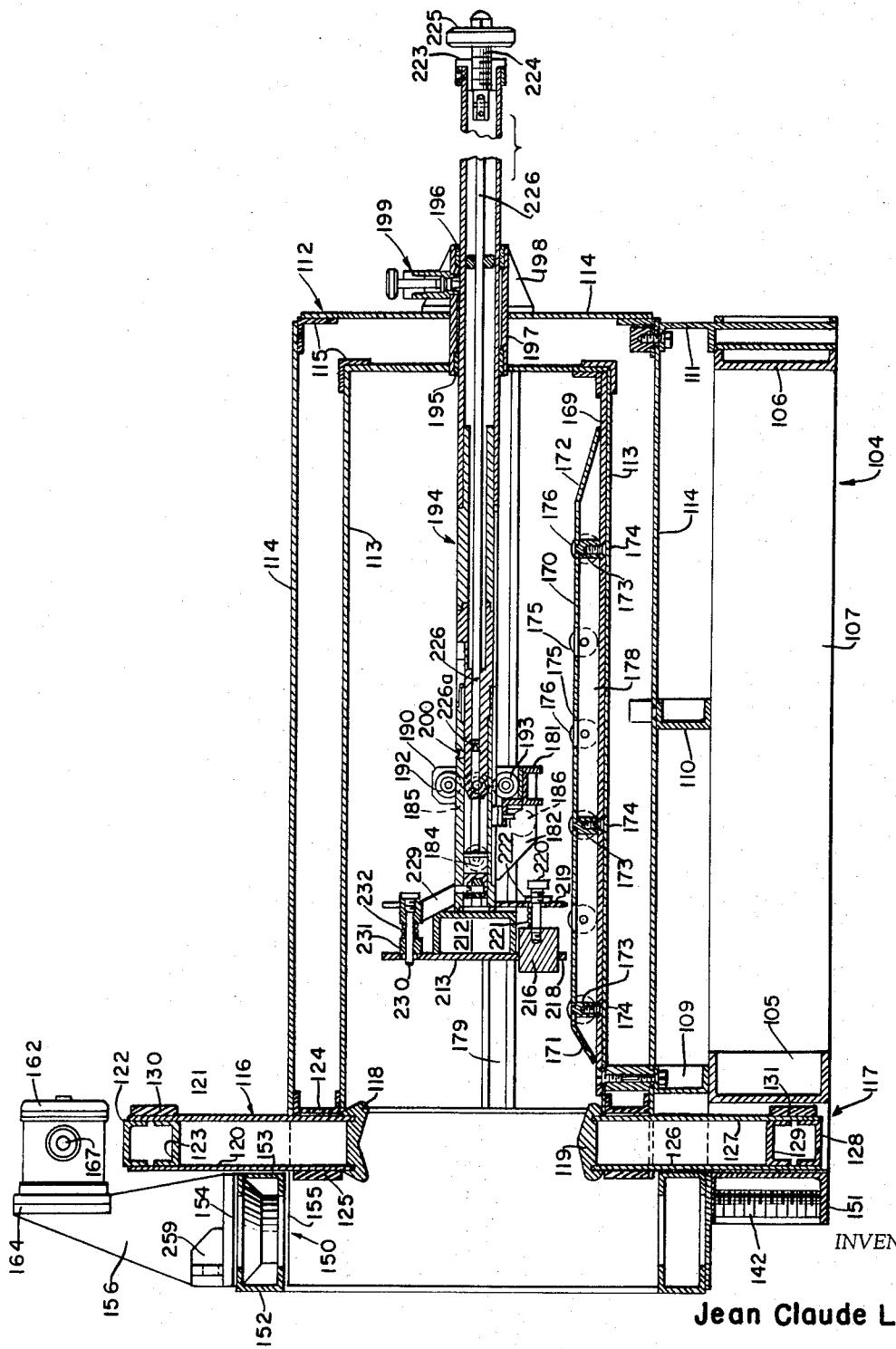
FIGURE 15 is a central vertical longitudinal section through the conveyance.
Figure 16:
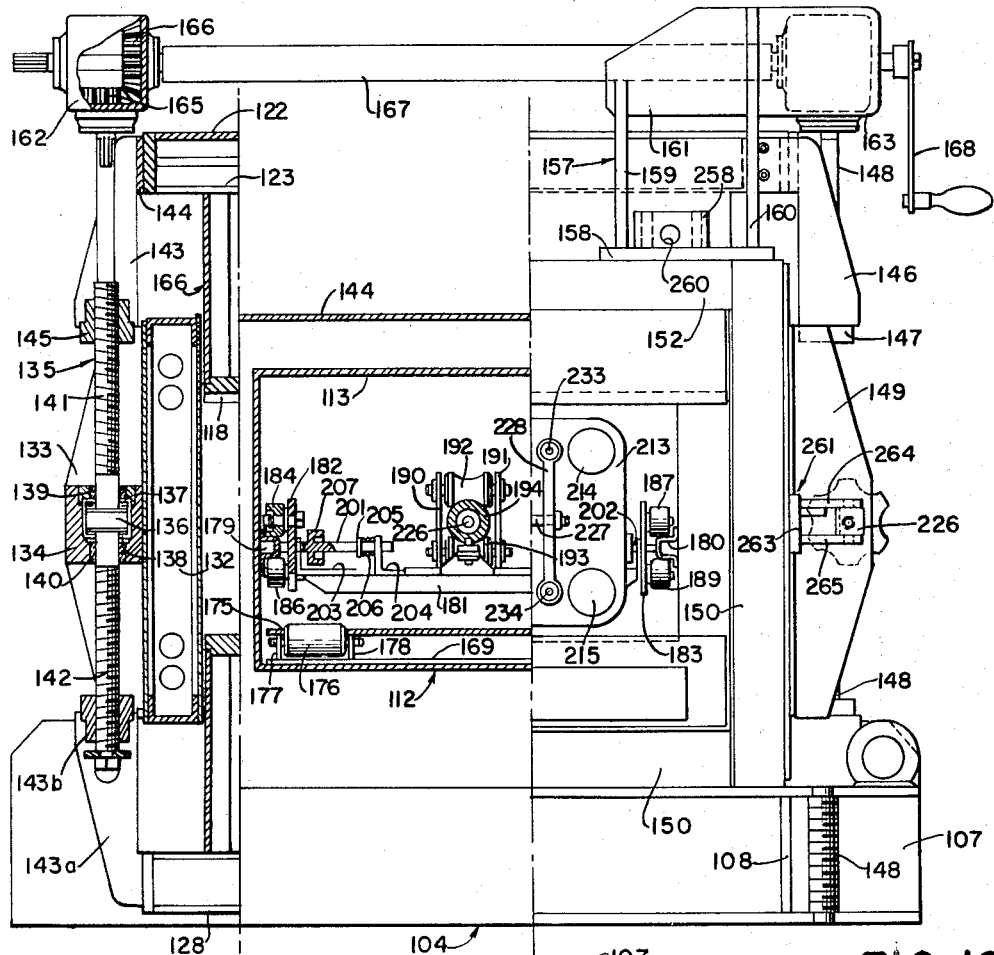
FIGURE 16 is a transverse section taken in planes identified by the broken line 16—16, FIGURE 17.

Referring more particularly to FIGURES 15, 16 and 17, a heavy rectangular chassis generally identified at 104, is made up of front and rear cross channels 105 and 106, respectively, connecting a pair of longitudinal side beams one of which, 107, is shown upon FIGURE 15 and the other of which, 108, apears upon FIGURE 16. It will be understood that this chassis is mounted for horizontal translation from a position immediately in front of the caisson, to a remote position where the radioactive unit may be safely discarded. The means for so mounting the chassis are immaterial so far as concerns the invention, and may consist of a wheeled truck, self-propelled or otherwise, a lift truck, a truck supported on ground level or overhead tracks, etc.

Chassis 104 supports three cross channels 109, 110 and 111, FIGURE 15, whose upper flanges define a horizontal plane, and to which is bolted the shielded housing or container generally identified at 112. Particularly from FIGURE 15 it is noted that this container comprises parallelepipedal inner and outer walls 113 and 114 reinforced at their meeting edges by angles 115, as is clear from inspection of the figure. The hollow space between these walls is filled with shielding plates of lead.

The front wall of the container is open and is adapted to be closed by a double-walled door comprising an upper section 116 and a lower section 117, mounted and interconnected by means subsequently described, for equal and opposit vertical translation from a first position wherein, as shown upon FIGURE 15, the sections are respectively fully raised and lowered to expose the interior of the housing, to a second closed position wherein the lower edge strip 118 of upper section 116 interfits with upper edge strip 119 to close and seal the opening. The door sections may be identical except for the cross sectional form of their meeting edges. Thus, upper section 116 comprises front and rear spaced sheet metal walls 120, 121, interconnected at their lower edges by strip 118 of solid metal, and at top edges by a pair of reversed channels 122, 123. Top door section 116 is guided for vertical translation within a transverse horizontal slot defined between channel 124 separating top walls 113, 114 of the housing, and beam 125 spaced forwardly thereof. Lower door section 117 is substantially identical with upper section 116 so that it is suffcient to identify its front and rear walls 126, 127, solid metal closure strip 119 and reversed channels 128, 129. Metal cross bars 130 for top door section 116, and 131 for lower section 117, each welded to its respective section, engage the top and bottom walls of the housing, to limit and determine the fully closed positions of the sections.

The door sections are interconnected for positive equal and opposite vertical movement, by a pair of threaded vertical shafts one at each side of the housing. Thus, referring to FIGURE 16 in particular, a beam 132 is fixed in vertical position to the side of the housing at the front edge thereof and includes a vertical side flange 133 and central bearing block 134. Shaft 135 has a thrust collar 136 fixed centrally thereof and is journalled by upper and lower antifriction bearings 137 located in a recess in block 134 to prevent axial movement thereof. Plain bearings 139, 140, top and bottom, carried by block 134, hold the shaft vertical. The shaft has upper and lower threaded portions 141 and 142 of the same but opposite pitch.

As clearly shown upon FIGURE 16, top channels 122 and 123 project outwardly to the left and right beyond the vertical side edges of upper door section 116. At the left, as shown, a bracket 143 is fixed at its top end, as by plate 144, to the ends of these channels. At its lower or depending end the bracket carries a nut 145 engaging the threads of upper portion 141 of the shaft. The construction at the right of FIGURE 16 is duplicated by that just described so that it is sufficient to identify bracket 146, and its nut 147. The other shaft, corresponding to shaft 135, is identified at 148, FIGURE 17, and is journaled by allochirally duplicate means as just described for shaft 135. Thus, referring to FIGURE 16, right side flange 149 corresponds to left flange 133 and carries a bearing block, not shown, in all respects like left block 134 and similarly journaling shaft 148 which threadedly engages nut 147.

Shafts 135 and 148 are interconnected for rotation in unison. Referring particularly to FIGURES 15 and 16, a heavy double-walled, rectangular lead-shielded frame generally identified at 150 is mounted about the door opening of housing 112 and projects forwardly therefrom. It is important to note that this frame is coordinated with the caisson so that its planar forward edge fits tightly against and in contact with plate 57 of the caisson, to enclose the loading opening in wall 38. Means subsequently described are provided to releasably secure the frame to the plate.

A channel 151 is fixed to chassis 104 to extend horizontally across the lower front edge thereof; and frame 150 is, in turn, fixedly supported on this channel. FIGURE 15 shows that the frame is a built-up unit of reversed channel bars such as 152, 153, interconnected by metal plates 154, 155, top and bottom, welded thereto.

Referring to FIGURES 15 and 16, a pair of right and left upright brackets are fixed to the top surface of frame 150. Left bracket 156 is shown upon FIGURE 15, while right bracket 157 appears upon FIGURE 16. The two are identical and from the latter figure are seen to comprise a base 158, laterally-spaced uprights 159, 160, and a plate 161 at the top of the uprights, all in unitarily connected relation. In FIGURE 16, left bracket 156 corresponding to the one just described, is omitted to show gear casing 162 bolted or otherwise fixed to the rear face of plate 164. Right gear casing 163, FIGURE 16, is similarly fixed to its bracket plate 161.

The two casings contain bevel gears. Referring to left casing 162, FIGURE 16, one bevel gear 165 therein is fixed to the top end of shaft 135 while the other 166, is fixed to horizontal shaft 167. The other end of shaft 167 enters gear casing 163 and there carries another bevel gear like 166 which, in turn, meshes with a gear affixed to shaft 148, so that shafts 135 and 148 are interconnected for synchronous rotation. The ends of shaft 167 protrude from the respective gear housings and are squared to receive a hand crank 168, FIGURE 16.

It will be understood that each of shafts 142 and 148 has its lower threaded portion engaging a respective one of a pair of nuts fixed with lower door section 117. Thus referring to FIGURE 16, it is sufficient to identify left lower bracket 143a fixed to the leftwardly protruding end of lower channel 128 of door section 117, and having fixed therewith a nut 143b threaded upon the lower section 142 of shaft 135. A like construction is used to connect section 117 at the right of FIGURE 16, with shaft 148.

Thus, turning of shaft 167 as by crank 168, moves door sections 116, 117 vertically, equally and oppositely, from the fully open position shown upon FIGURE 15 to a closed position wherein edge strips 118, 119 interfit.

Means are provided within housing 112 to support the filter unit for facile translation into and out of the same. The floor of the housing is formed by a heavy metal plate 169. A second lighter plate 170 is bent at its forward and rearward ends to form ramps 171, 172, and is fixed above and in parallel spaced relation with floor plate 169, by spacers 173, FIGURE 15. As shown, these blocks or spacers are fixed to plate 169 by screws 174.

The planar portion of plate 170 has a plurality of slots 175 formed therein along and adjacent its right and left edges. The slots at each side are in line and are equally spaced, there being six along each side in the model shown. Referring to FIGURE 16, a plurality of rollers such as 176 are mounted for rotation on floor plate 169. Each fits a respective slot so that its upper periphery projects a short distance above the plane of plate 170. These rollers are conveniently mounted by pairs of bearing plates such as 177, 178, FIGURE 16, fixed to plate 169 in fore-and-aft parallel relation. Each pair of plates has aligned holes spaced therealong in which the ends of the shafts of the respective rollers are secured. When a filter unit is in the casing its lower flat surface rests upon and is suported entirely by the upwardly-exposed portions of rollers 176 so that it may be moved into and out of the container with but a small force.

Means are provided operable from the rear wall of the container exteriorly thereof, to engage a filter unit within the caisson and withdraw it into the container 112, as well as to translate a unit within the container, into the caisson.

For this purpose horizontal channel-shaped tracks 179, 180 are fixed, as by welding to the inner side walls of the container. A base channel 181 spans the space between these tracks and at each end carries an upstanding bracket 182, 183. Confining attention to bracket 182, a pair of longitudinally spaced rollers 184, 185 are journaled on respective shafts fixed to the bracket and ride on track 179. A retaining roller 186 is likewise mounted on bracket 182, with its axis in a vertical plane midway between the planes of the axes of rollers 184, 185, and acts to positively hold the upper rollers to the track. The mounting of base channel 181 at its right end upon track 180, as viewed upon FIGURE 16, is a duplicate of the one just described so that it is sufficient to identify upper rollers 187, 188, FIGURES 16 and 17, and lower roller 189.

Base 181 has a pair of laterally spaced parallel arms 190, 191 fixed thereto and journaling between them, upper and lower guide rollers 192, 193 to receive between them a thrust tube generally identified at 194. As shown particularly well upon FIGURE 15, this tube extends rearwardly and passes to the exterior of the container through gas-tight packing glands 195, 196 in the respective ends of metal sleeve 197. This sleeve is fixedly carried by bracket 198 attached to rear wall 114 of the container, and sealed within apertures of the inner and outer rear walls. Outside the container, tube 197 carries a spring-pressed plunger assembly 199 with its plunger urged downwardly into engagement with the thrust tube to enter a radial hole 200 therein, FIGURE 15, and thus releasably maintain the tube in fully retracted position. When plunger 199 is released by pulling up on the head thereof, tube 194 may be slid forwardly. As will be subsequently described, the tube, rollers 192, 193, bridge 181, etc., initially move forwardly as a unit on and along tracks 179, 180. As the bridge arrives at its limiting forward position on and along these tracks, a pair of spring-pressed pins 201, 202, left and right, FIGURE 16, carried by the bridge, snap into holes in tracks 179, 180, respectively, and thus releasably lock the bridge and all parts carried thereby, in forwardmost position. Thereafter tube 194 moves alone over and along rollers 192, 193, until its forward end enters the caisson and contacts the front wall of the filter unit therein.

Since both locking pin assemblies 201, 202 are alike, a description of 201 will suffice. Referring to FIGURE 16, pin 201 is mounted for horizontal transverse sliding in outer and inner laterally spaced brackets 203, 204. Between these brackets the pin has a flange 205 fixed thereto and a coil spring acts between the flange and bracket 204 to urge the pin to the left, FIGURE 16, so that it snaps into a hole in track 170 when bridge 181 is at its forwardmost limiting position. A cup 207 is also fixed to pin 201. Referring to FIGURE 17, a rod 208 has its forward end fixed to the rear face of a magnet 217. The rearward end of the rod curves 90° outwardly and normally, in the position shown, extends within the annular channel in the cup. Thus, since pin 201 is held in the position shown, by contact of its outer end against track 177, under urge of spring 206, rod 208 acts to carry bridge 181 along as a unit with plate 213 so that there is no movement of tube 194 with respect to rollers 192, 193. However, as the bridge arrives at the forward end of its supporting tracks 179, 180, pin 201 snaps into a hole in track 179 and thus locks the bridge in forwardmost position. At the same time cup 207 moves outwardly with its pin, free of rod 208. Thereafter tube 194 rolls on rollers 192, 193 in continued forward movement.

Since the locking pin construction for the bridge, positioned at the other side of the container, is a duplicate of that just described, it is sufficient, referring to FIGURE 17, to identify locking pin 202, flange 209, spring 210 and cup 211. The rod corresponding to 208 at the other side of the container is omitted. As will be understood, this rod has one end fixed to magnet 214 and its other end curved 90° to normally enter within the channel in cup 211.

Tube 194 is formed in sections detachably secured together as by screw threads so that when fully retracted with plunger 199 in hole 200, the portion of the tube projecting rearwardly from gland 196 may be detached until again required. At its forward end the tube has detachably fixed thereto, as by screw threads, a forwardly disposed hollow box-like frame 212 having a head plate 213 fixed to its forward rim. As seen upon FIGURE 16 the plate is essentially square. At each of its four corners the plate carries a cylindrical magnet. Two of these, 214 and 215 are shown upon FIGURE 16. A third appears upon FIGURE 15 and the fourth 217 together with 214 is seen upon FIGURE 17. Referring to FIGURE 15, magnet 216 has a smooth fit within a hole 218 in the lower left corner of plate 213. An arm 219 has one end fixed to the forward end of tube 194. A screw 220 has its forward end threaded into a hole in the rear face of the magnet and extends slidably through an opening in the adjacent end of the arm. A compression coil spring 221 is disposed about the screw and acts between the arm and magnet to urge the latter into the forward limiting position shown, wherein the forward face of the magnet is a little in advance of head plate 213. This limiting position is determined by a collar 222 fixed to the screw and contacting the rear face of the arm. All four magnets, namely, 214, 215, 216 and 217 are similarly mounted as just described for 216.

Means are provided to separate the magnets from a filter element after the latter has been fully withdrawn from the caisson into container 112. As shown, the rearward end of tube 194 is sealed by a plug 223 having a central opening in which the shank 224 of a knob 225 is threaded. The shank has a swivel connection with a rod 226 extending centrally of and within tube 194 to the forward end thereof where it is attached centrally to a cross bar 227 extending through diametrically opposite slots in tube 194. Preferably rod 226 is made in two sections abutting at a point 226a, FIGURE 15. Each end of bar 227 has fixed thereto a respective one of two forked brackets 228, 229. The upper and lower ends of each bracket terminate in cylindrical enlargements having horizontal bores parallel with tube 194. Referring to FIGURE 15, a thrust rod 230 is threaded into the bore in the upper end of bracket 229 and extends with a smooth fit through aligned holes in plate 213 and a collar welded to the rear face of the plate. A coil compression spring 232 surrounds the rod and acts between the bracket and collar to urge the forward end of rod 230 into the limiting position shown wherein it protrudes a short distance forwardly from plate 213. Reference to FIGURE 16 shows that each of the four thrust rods, like 230, just described, is mounted adjacent a respective one of magnets 214 through 217. Since all four rods are similarly mounted and spring pressed it is sufficient to identify thrust rods 233, 234, FIGURE 16. The rod at the lower end of bracket 229 is not shown but is mounted similarly to the others as just described for rod 230.

Thus, as knob 225 is turned it is advanced axially in and along tube 194. Brackets 228 and 229 are thrust forwardly together with the four pins 230, 233, 234, etc., so that each projects forwardly of plate 213, engages the wall of a filter element held by attraction of magnets 214 through 217, and thrusts the filter element away until the magnets substantially lose their grip upon it and the entire assembly of tube 194 etc., can be withdrawn to its limiting rearward position leaving the filter element and its containing sack mounted on rollers 176. It will be understood that the element is completely enclosed within its sack so that at no time do the magnets come into actual direct contact with the element. In other words, the two are separated by a distance equal to the small thickness of the material of the sack.

It has been previously explained that the shielded container for removing a spent filter element from the caisson, is mounted on a vehicle by which the element may be transported to a remote place of disposal. The magnetic coupling between thrust tube 194 and the filter element plays no part in support of the element as it moves from within the caisson into the container. Hence it is very desirable that the tops of rollers 176 within the container, be horizontally coplanar with roller means 81 in the caisson loading opening, so that the element rolls smoothly and easily into and out of the container. For this reason the container is mounted upon a mechanism which enables vertical adjustment thereof to a high degree of precision.

Figure 18:
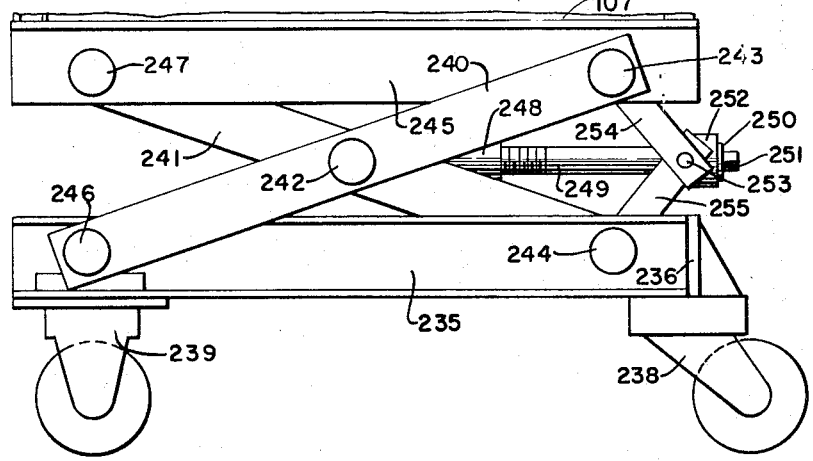
FIGURE 18 is a side elevation of truck mechanism for supporting the shielded container for horizontal translation and for adjustment in height.

FIGURE 18 shows one suitable means for supporting the container for adjustment in elevation and wherein is shown a portion of side beam 107 also appearing in FIGURE 15. A rectangular base is built up of two parallel, longitudinal side channels such as 235, rigidly united at their rear lower faces by cross bar 236 and at their forward ends by a second cross bar not shown. Four casters of which two, 238 and 239 appear upon FIGURE 18, are fixed, each to a respective end of the two side channels. Caster 239 and its companion at the other side, have the axes of rotation of their wheels in alignment and fixed with the support. Caster 238 and its companion at the other side of the conveyance, are swiveled for pivoting about vertical axes offset horizontally from the axes of the wheels thereof. Two parallel longitudinal horizontally-spaced top channels one of which is identified at 245, support beams 107, etc. of the container.

Two pairs of crossed beams interconnect the side beams such as 235 and 245. Since both pairs are alike in construction and arrangement a description of one pair will suffice. Beams 240, 241 are connected at their centers by pivot rod 242. A spacer collar not shown, is interposed to separate them by a distance equal to the thickness or transverse horizontal dimension of channels 235 and 245. Beam 240 is connected by pivot rod 243 to top longitudinal 245 of the conveyance and upon which beam 107 rests and to which it is rigidly connected by bolts. Likewise beam 241 is connected by pivot rod 244 to channel 235 at the rearward end thereof.

At its forward end beam 240 is pivoted at 246 to a bearing 237 mounted for fore-and-aft sliding on and between the flanges of side channel 235. Likewise beam 241 is pivoted at its forward end at 247, to a slide not shown, mounted by any suitable guides fixed to the inner side face of beam 245 for fore-and-aft movement. Pivot rods 242, 243 and 244 extend across the conveyance and at their ends remote from those depicted upon FIGURE 18, are pivotally connected with the second pair of crossed beams, not shown but identical in construction with 240 and 241.

At its central portion, pivot rod 242 passes with a smooth fit through an aperture in a nut 248 which has a threaded hole opening rearwardly and engaged by a shaft 249 threaded at its forward end. The rearward end of the shaft has a pair of integral axially-spaced flanges such as 250, and terminates in a squared end 251. A collar 252 is journaled on shaft 249 with a smooth fit between the flanges thereof and has a pair of aligned trunions one of which is identified at 253, extending horizontally in opposite directions therefrom. Two pairs of links connect the trunnions of collar 252 with the pivot rods 243 and 244. The links of one pair are identified at 254, 255. The other pair are not shown, being parallel with and, in FIGURE 18, disposed behind 254 and 255, respectively. Link 255 is pivoted at its respective ends on trunnion 253 and rod 244. Link 254 is pivoted at its respective ends on trunnion 253 and rod 243.

Thus, in a way obvious from inspection of FIGURE 18, disposed behind 254 and 255, respectively. Link 255 end of shaft 249 and on turning thereof the separation of nut 248 and collar 252 is varied to correspondingly pivot beams 240 and 241 equally and oppositely and thus adjust the elevation of beam 245 and the container for the filter element, with respect to the floor. Of course, numerous other alternative constructions such as four interconnected jacks one at each corner of the base frame including channel 235, may be substituted for the construction just described. It is also contemplated that the container assembly may be supported by tackle blocks and chains from overhead conveyor tracks.

It is very important that shielded container 112 be colocated precisely horizontally and vertically with respect to the caisson when a fresh filter element is to be moved therefrom into the caisson, or when a spent element is to be removed from the caisson into the container. It is equally important that the container and its conveyance be positively locked to the caisson during transfer of a filter element therefrom or thereinto at the correct position with roller 81 of the caisson horizontally coplanar with rollers 176 in the container.

Reference to FIGURES 10 and 11 shows that plate 57 fixed to the forward or "cold" face of the shielding wall, has, respectively, right and left centering pins 256, 257 anchored thereto adjacent its top edge and located symmetrically on opposite sides of the vertical center line thereof. FIGURE 10 shows pin 256 in side elevation.

Returning to FIGURES 15 and 16, the shield rectangular frame 150 surrounding and extending forwardly from the door opening of container 112 has been described. The top horizontal channel bar 152 of this frame carries shaft brackets 156 and 157 also previously described. Fixtures 258 and 259 are secured to the respective bases of these brackets. Fixture 258 is shown upon FIGURE 16 and 259 upon FIGURE 15. The two are duplicates and from FIGURE 16 it is noted that fixture 258 has a hole 260 in which is received with a smooth accurate fit, a pin 256. The holes in the respective brackets are separated by the same distance as pins 256 and 257 and are so positioned in elevation that when these pins are received each in one of the holes such as 260, frame 150 is flush against caisson plate 57 and all door openings are in registration, with rollers 176 horizontally coplanar with caisson roller 81.

Great care must be exercised to assure that, while loading a fresh filter element or cartridge, or while unloading a spent element, there is no possibility of the conveyance and the shielded container supported thereby, separating from the caisson. For this purpose, referring especially to FIGURES 16 and 17, a pair of brackets 261 are attached to the vertical side walls of frame 150. Bracket 261 consists of a base 263 and two vertically-spaced arms 264, 265 integral with the base and receiving between them a block 266 having vertically aligned integral trunnions each fitting a hole in the end of a respective arm. The block has a horizontal aperture in which slides the straight shank portion of a hook 267, FIGURE 17. The shank is threaded and provided with a keyway and a key also fitting the aperture in block 266 so that the hook may move axially but cannot turn on its axis. A handwheel 268 is threaded on the shank of hook 267 and abuts block 266 so that by turning of the handwheel the hook may be axially retracted with respect to the block. Reference to FIGURE 17 shows that the hook assembly at the other side of frame 150 is a duplicate of the one just described so that it is sufficient to identify, in addition to bracket 262, block 269, hook 270 and handwheel 271.

These hook assemblies cooperate with abutments or eyes on caisson plate 57. Referring particularly to FIG- URE 11, these eyes are identified at 272 and 273, left and right. Each is rigid with a base such as 274 welded or otherwise fixed to the plate. The relation of the parts is such that when pins 256 and 257 are in their respective locating holes in fixtures 258, 259, each of the hooks 267, 270 can be pivoted about its vertical axis to the positions shown upon FIGURE 17, where they are engaged within eyes 272, 273, respectively. Then by turning down handwheels 268, 271 the entire container assembly is drawn toward plate 57 until the forward vertically-planar edges of frame 150 are in firm and precise contact with the plate and there is no possibility of separation unless and until the handwheels are backed off and each hook swung away from its eye, hook 270 being swung counterclockwise and hook 267 clockwise, as viewed at FIGURE 17.

*Operation*

In operation, assuming that a caisson is off stream, empty and ready for charging with a new filter unit, the unit within its plastic sack and resting on rollers 176 within container 112, with door sections 116, 117 closed, the conveyance or truck is moved up in front of door 82. Handwheels 73, 76 and 77 are loosened and removed or swung free of the forked projections on cover 69. The cover is removed and set aside. Crank 168 is operated to translate door sections 116, 117 to the open position shown upon FIGURE 15 and the sack enclosing the filter element within container 112 is drawn out and its mouth is fitted snugly over and about the corrugations 67, 68 of flanged wall 66. If desired a heavy rubber band or spring belt previously positioned over the flange, is rolled over the mouth portion of the sack to further assure a gas-tight seal.

The conveyance is now given a final movement until the front edges of frame 150 are contiguous to plate 57. If the container is not at the proper elevation, a crank is attached to the square end 251 of shaft 249 and turned until pins 256, 257 on plate 57 ride smoothly into the locating holes of fixtures 258, 259. Hooks 267, 270 are swung until each engages within its eye 272, 273, after which handwheels 268, 271 are turned down to draw the vertically coplanar front edges of shielding frame 150 into tight engagement with plate 57, thus enclosing the flanged wall 66 of cover support 64.

Handwheel 86 is now turned, after removal of locking pin 89, until lead door 82 is fully open and tube 194 is thrust forwardly to engage and translate the filter element on rollers 176 and 81, out of the container and into the caisson. As the filter element moves out of its sack, since the mouth of the latter is fixed about flanged wall 66, the sack remains forwardly of door 82. When the filter element is correctly positioned within the caisson as by abutment with the rear wall thereof. Knob 225 is turned to thereby move rod 226 forwardly thus projecting pins 230 etc. forwardly against the filter element. This acts to move magnets 214 through 217 rearwardly and free them from the element. Thrust tube assembly 194 is now withdrawn into container 112.

Next, door 82 is lowered to the position shown upon FIGURE 10. Handwheels 268 and 271 are backed off and hooks 267, 270 are swung aside free of eyes 272, 273. The conveyance is rolled back after crank 168 has been actuated to move door sections 116, 117 thereof into the fully closed position. Without removing the mouth portion thereof from flange 66, the body portion of the sack is rolled and shoved into the space defined by the flange. Cover 69 is replaced over the flange and sack portion thereabout and handwheels 73, 76 and 77 are turned down to fix the cover securely in place. A crank is applied to the squared ends of shafts 35 and 48 and turned to thereby elevate the filter element within the caisson until it makes a gas-tight seal with the edges of opening 7. Door 82 is lowered. Dampers 4 and 15 are swung to open position as in FIGURE 1, to place the caisson on stream.

In removing a spent filter element from the caisson, the foregoing procedures are performed in substantially the reverse order. After the empty container is located and secured to plate 57, cover 69 having been previously removed and set aside, doors 82 and 116, 117 are opened. Thrust tube 194 is moved forwardly and its forward plate 213 first picks up the body portion of the plastic sack within flange 66. The bottom of the sack then moves with the plate through the loading openings in wall 38 and the caisson until magnets 214 through 217 adhere to the front wall of the filter element, with the base or bottom of the sack interposed therebetween. Tube 194 is now withdrawn and pulls the filter element with it as the latter rolls over the supporting rollers in the caisson and, later, in the container. Since the mouth portion of sack 19 is still secured over and about flange 66, while the bottom thereof is clamped between the magnets and the forward end of the filter element, the latter is gradually encased by the sack.

After the element is fully withdrawn into container 112, the latter is released from plate 57 in the manner previously described and back off a distance sufficient to expose the mouth portion of the sack. This portion is then sealed together as by compressing the plastic between two heated strips. Sealing is effected over a substantial area. The sealed area is then severed to leave one portion thereof sealing the spent filter within the body of the sack and the mouth portion sealed over the flange 66. Door sections 116, 117 are closed together and the conveyance is moved to a suitable place for safe disposal of the radioactive filter element.

Before closing door 82 the mouth portion of sack 19 which has been severed from the body portion, is not removed but is simply slid forward on flange 66 until it is free of corrugation 67 but still encompasses corrugation 68. When a new filter unit within container 112 is positioned before the caisson in closely spaced relation therewith, the mouth of its sack is withdrawn and slid over and about the flange 66 until it overlies both corrugations and is secured by corrugation 67. At this time pouch 20 forming an integral part of the sack, hangs down as shown upon FIGURE 5. The sealed mouth portion of the sack from the previous filter element can now be grasped by pinching together wall portions of the new sack, and pulled off corrugations 68 of flange 66, whereupon it drops into pouch 20. The latter is now sealed and the sealed area is severed to leave a portion sealing the cut portion of the used sack within the pouch and the new sack fully sealed and secured over and about the flange. The new filter element is now advanced and emplaced into the caisson as previously described and the caisson is ready to place on stream.

It should be noted that at the start of forward movement of thrust tube 194, bridge 181 is located closely adjacent rear wall 114, and the entire assembly of tube, plate 213, and bridge, move forwardly as a unit, supported and guided by rollers 184, 187, due to the fact that the curved end of tube 208 is within the channel of cup 207. As the assembly including head plate 213 reaches the forward end of the container 112, bridge 181 is stopped by movement of pins 201, 202 into their respective holes in tracks 179, 180. This movement frees the rods from cups 207, 211 so that the bridge is, at one and the same time, locked in forwardmost position, and plate 213 and the magnets carried thereby are free to continue forward motion out of the container and into the caisson.

There is thus provided a combination of elements which cooperate to effect all of the objects stated. Radioactive emanations from the interior of the caisson are effectively prevented from emergence therefrom. The filter elements are loaded into and unloaded from the caisson without exposure and the caisson is sealed completely at all times and fully shielded during operation thereof. All operations of moving the "hot" filter unit are controlled and effected from the outer side of wall 38. The radioactive unit is effectively shielded during transfer into the container; and once therein, with door sections 116, 117 closed, is completely shielded to prevent escape of rays therefrom. Polyvinyl chloride is preferred for the sack and polyethylene is also useful but these two constitute a preferred class.

Many changes in details of construction, modification, substitutions of equivalents, rearrangement of parts and different procedures in use will readily occur to those skilled in the art after a study of the foregoing description. Hence the disclosure should be taken in an illustrative rather than a limiting sense. All modifications within the scope of the subjoined claims are reserved.

Having thus fully disclosed the invention, what I claim and desire to secure by Letters Patent is:

1. The method of removing from a filter casing, through a loading opening in a wall thereof, a filter element for radioactive gases passed through said casing, comprising, fixing the mouth portion of a sack of plastic sheet material to and about the opening, to seal the same, withdrawing the filter element through the opening and into the sack, sealing the sack between the filter element therein and the mouth portion of the sack, and severing the sealed area of the sack to leave a first portion of said area sealing the element within the sack, and a second portion of said area sealing the loading opening of said casing.

2. The method of removing from a filter casing, through a flanged loading opening thereof, a renewable filter element for radioactive gases passed through said casing, comprising, sealing the mouth of a flexible sack of plastic sheet material over and about the flange of said loading opening, translating the filter element through said opening, into said sack without removal of the sack from the flange, sealing the sack material together between the flange and filter element, and severing the sealed portion of the sack to leave the element sealed within the sack and the severed mouth portion of the sack sealing the loading opening of the casing.

3. That method of removing a spent filter element from a filter casing through a loading opening in the wall thereof and replacing the spent element with a fresh element, comprising, securing the mouth of a first sack of flexible sheet material to and about the periphery of said loading opening to seal the same, withdrawing the spent filter element through said opening and into the first sack, sealing the first sack between said element therein and said loading opening, severing the sealed area of the first sack to leave a first portion thereof sealing the element within the sack and a second portion thereof sealing said loading opening, removing the sealed sack and spent filter element therein, sealing the mouth of a second sack having a fresh filter element therein, over and about said loading opening and the mouth portion of the first sack, removing the mouth portion of the first sack into a pouch portion of said second sack, sealing said pouch portion between the mouth portion of said first sack therein and the body portion of the second sack, severing the sealed area of the pouch to leave first and second areas respectively sealing the pouch with said first sack portion therein and said second sack, moving said fresh filter element from said second sack into the filter casing, through said loading opening, folding said second sack into said opening, and affixing a cover over and about said opening to enclose the same and encompass said second sack in emplaced position in sealing relation with said opening.

4. The method of removing a spent renewable filter element from a filter casing for radioactive gases, through a flanged loading opening therein, there being a sack of flexible plastic material having its mouth portion fitting over and fixed in gas-tight relation about the flange of said loading opening, comprising, translating said spent filter element through said opening, into said sack, sealing together the walls of said sack between the spent filter element therein and the mouth of the sack, severing the sealed portion of the sack to leave a first area thereof sealing said spent filter element within the body portion of the sack and a second area thereof sealing said mouth portion over the loading opening, and transporting said body portion and spent filter element therein as a unit to a remote point for disposal.

5. The method of claim 4, said translating being effected by inserting through said loading opening, one end of a manipulator into position against said spent filter element in said casing, with said sack interposed, magnetically coupling said one end to said filter element, through the material of the sack, and withdrawing the manipulator and element as a unit until said element is enclosed with said sack, externally of said casing.

6. In a filter caisson, a casing having walls defining an intake chamber and an exhaust chamber with a passage between said chambers, and means within said casing and operable to support and translate a filter unit in a direction normal to the plane of said passage, from a first position wherein the filter unit is in gas-tight contact with said passage, to a second position wherein the filter unit is spaced from said passage for translation through a loading opening in the wall of said casing.

7. The caisson of claim 6, said means including a part exteriorly of said casing and operable to actuate said means between said first and second positions.

8. The caisson of claim 6, said means when in said second position supporting a filter unit for horizontal translation through said loading opening.

9. In a caisson for filtering of radioactive fluids, a generally parallelepipedal sheet metal casing having a front wall, an internal partition dividing said casing into an inlet chamber and an outlet chamber, there being an opening in said partition through which fluid passes from said inlet chamber to said outlet chamber, first and second spaced parallel shafts journaled in said outlet chamber, cam means fixed with said shafts and adapted to engage a renewable filter element within said casing, and means connected with said shafts and operable externally of said casing for rotating said shafts and cam means to effect movement of a filter element in said casing, from a first position in gas-tight sealing contact with the edges of said opening, to a second position clear of said edges for translation through a loading opening in said front wall of said casing.

10. In a caisson assembly for the filtering of radioactive fluid, a generally parallelepipedal sheet metal casing having a vertical front wall, a horizontal partition in said casing dividing the same into inlet and outlet chambers, there being a rectangular opening in said partition through which fluid passes from said inlet chamber to said outlet chamber, first and second horizontal horizontally spaced shafts journaled in said casing below said opening, two pairs of cams, each said pair being fixed to a respective one of said shafts in spaced relation therealong, said cams being constructed and arranged to conjointly support a renewable filter element in said casing, and means operable exteriorly of said casing at said front wall thereof, for rotating said shafts and cams to effect vertical translation of a filter element, from a first elevated position in sealing contact with said opening, to a second lowered position free of said opening for translation through a loading opening in said front wall.

11. The caisson assembly of claim 10, and horizontal roller means adjacent said loading opening substantially coplanar with the lower surface of a filter element when in its said second position, to support and guide the same in movement through said loading opening into and out of said casing.

12. The caisson assembly of claim 10, a sheet metal enclosure comprising vertical front and rear spaced walls parallel with and contiguous to said front wall and having openings therein in registration with said loading opening, a cover support having a rear edge secured to the edge of and enclosing said opening in said front wall, and including a forwardly projecting oval flange having axially spaced, parallel, circumferentially continuous corrugations, and an imperforate cover including a skirt fitting over and about said flange in circumferential contact with said corrugations.

13. The caisson assembly of claim 12, a vertical lead shielding wall disposed contiguous to and parallel with said front wall of said enclosure, said cover support extending through an opening in said shielding wall, to the front side thereof.

14. The caisson of claim 13, and pin means fixed with and projecting forwardly from said shielding wall, adjacent said cover support, for engaging and positively colocating with respect to said flange, a conveyance for a filter element to be moved into and out of said caisson casing, through said loading openings.

15. The caisson assembly of claim 12, a lead shielding door mounted within said encolsure for guided vertical translation in its own plane, from a lowered first position closing said loading openings in said casing and shielding wall, to a second raised position clear of said openings, a shaft journaled in the walls of said enclosure and projecting through said shielding wall, a hand wheel affixed to said shaft on the forward side of said shielding wall, and means connecting said shaft and shielding door to translate the latter between its said first and second positions, by and in response to rotation of said hand wheel.

16. The caisson of claim 15, said last-named means comprising first and second idler pulleys journaled in said enclosure, a shaft journaled in the walls of said enclosure between said pulleys and passing through said shielding wall to the front thereof, a third pulley fixed to said shaft within said enclosure, first and second cables each passing over and about a respective one of said first and second pulleys and having its first end secured to a respective one of two horizontally spaced points on said shielding door, the second ends of said cables being secured to and about said third pulley.

17. A caisson assembly for filtering radioactive gases, comprising, a vertical shielding wall, a caisson casing having a vertical wall adjacent, parallel with, and spaced from said shielding wall, a sheet metal enclosure between said walls, there being openings in registration in said walls and enclosure, through which a filter element may be inserted into and withdrawn from said casing, a flat shielding door slidable in its own plane in said enclosure, from a first position closing said openings, to a second position free of said openings, and means connected with said door to operate the same between said first and second positions.

18. The assembly of claim 17, said last-named means including a manually-operable handwheel on the side of said shielding wall remote from said casing and enclosure, said door being guided for vertical translation between vertical, parallel, spaced front and rear walls of said enclosure.

19. In a mechanism of the kind described, in combination, a vertical shielding wall having a first loading opening therein for a renewable filter element, a filter casing having a front wall spaced from said shielding wall adjacent thereto and having a second loading opening in registration with said first opening, a movable conveyance, a shielded container for a filter element, means mounting said container on said conveyance for vertical adjustment with respect thereto, a third loading opening in one wall of said container, and cooperating means fixed with said container and said shielding wall and interengaging only when said third opening is in registration with said first and second openings, contiguous to said shielding wall, said means operating positively to lock said third opening in registration position.

20. The mechanism of claim 19, and roller means carried by said container and shielding wall, said means being horizontally coplanar when said cooperating means are in engagement.

21. The mechanism of claim 19, said cooperating means comprising first and second spaced pins fixed with said shielding wall, and first and second apertured fixtures fixed with said container, each said pin fitting within an aperture of a respective one of said fixtures when said third opening is in registration with said first and second openings.

22. In a filtering caisson for radioactive fluids, a filter casing including a vertical front wall, a vertical lead shielding wall parallel with and adjacent said vertical wall, there being first and second registering loading openings in said walls, respectively, a circumferentially continuous sheet metal cover support fixed with and about said first opening in registration therewith and extending through said second opening to the front side of said second wall, to terminate in a circumferentially corrugated flange, a sack of flexible plastic material having its mouth portion fitting over and about said flange and the corrugations thereof, the body of said sack being folded into the space defined and surrounded by said flange, and an imperforate cover including a skirt portion fitting snugly over and about said flange and the mouth portion of said sack.

23. The caisson of claim 22, a flat metal plate fixed to the front face of said shielding wall and having an opening in registration with the loading opening therein, said cover having a plurality of forked projections disposed in spaced relation about and projecting radially from the front face of the cover, a like plurality of rods each extending through the fork of a respective one of said projections and having its inner end engaged with said plate, and a plurality of handwheels each threaded onto the outer end of a respective one of said rods and turnable to engage its respective projection and force said cover onto said flange, and a sealing ring inside said cover to effect gas-tight seal with the forward edge of said flange.

24. The caisson of claim 23, and a first pair of spaced colocating means fixed to said plate, a conveyance including a shielded container having a front vertical wall with a loading opening therein, and a second pair of spaced colocating means carried by said conveyance and engageable with said colocating means of said plate, only when said conveyance is positioned with its loading opening in contiguous registration with the opening in said shielding wall and enclosing said flange.

25. In a structure for loading and unloading a renewable filter element for radioactive fluids, a wheeled conveyance, a container of shielded metallic walls mounted on said conveyance and having an open front, a door comprising upper and lower and lower vertically coplanar sections, means mounting said sections on said container for guided vertical translation contiguous said open front thereof, and means interconnecting said sections for equal and opposite translation from a first position conjointly closing said front opening, to a second position free and clear of said opening.

26. The conveyance of claim 25, roller conveyor means mounted on the floor of said container to support a filter element for movement through said open front, a thrust tube mounted in the rear wall of said container for axial sliding longitudinally thereof, a pair of longitudinally disposed tracks each carried by a respective side wall of said container internally thereof, a bridge extending transversely across and within said container, roller means mounting said bridge at each end thereof, on a respective one of said tracks, and roller means carried by said bridge centrally thereof and supporting said tube within said container, the end of said tube within said container being engageable with a filter element therein, to move the same through said front opening thereof.

27. A container for a filter element for radioactive fluids, said container having a longitudinal axis of symmetry and comprising interconnected top, bottom, side, and one end wall, all said walls being of lead, the remaining end of said container being normally open, a gland mounted centrally in said end wall, a thrust tube fitting said gland for sliding in and along said axis, and magnet means carried by the end of said tube within said container for magnetic engagement with a filter element therewithin.

28. The container of claim 27, said magnet means comprising a plate fixed to the end of said tube within said container, a magnet mounted for sliding through an aperture in said plate parallel with said axis, means yieldingly urging said magnet into a limiting position with one face thereof in advance of said plate, a release rod mounted within said tube for axial sliding therealong, and means within said container connected with said rod and operated by axial sliding of said release rod to engage a filter element and separate the same from said magnet.

29. The container of claim 28, said thrust rod and release rod being manipulative from the exterior side of said end wall.

30. The combination with a filter casing having a flanged loading opening fixed therewith, of a flexible sack for a filter element for said casing, said sack having a mouth fitting about the flange of said loading opening, in gas-tight relation therewith.

31. The combination of claim 30, a filter element in said casing and disposed over and across a fluid passage therein, to filter all fluid passing therethrough, said sack being folded into the space defined by said flange of said opening, and a cover having a skirt fitting over and about said flange to confine the mouth of said sack thereto.

32. A sack of flexible material to enclose and seal a filter element, said sack having a mouth adapted to fit snugly about a flanged loading opening of a filter casing, and a pouch integral with said sack, in communication therewith, and depending from the wall thereof adjacent said mouth.

33. The sack of claim 32, said material being polyvinyl chloride.

34. The sack of claim 32, and a filter element within said sack, the edges of said mouth being sealed together to thereby seal said element gas-tight within said sack.

35. The sack of claim 32, said material being polyethylene.

References Cited
UNITED STATES PATENTS 2,804,165    8/1957    Blomgren et al. _____ 55—385
3,059,831    10/1962    Trexler.

FOREIGN PATENTS 1,091,415    10/1960    Germany.

HARRY B. THORNTON, *Primary Examiner.*

S. W. SOKOLOFF, *Assistant Examiner.*

UNITED STATES PATENT OFFICE
CERTIFICATE OF CORRECTION

Patent No. 3,354,616                                November 28, 1967

Jean Claude Lucas

It is hereby certified that error appears in the above numbered patent requiring correction and that the said Letters Patent should read as corrected below.

Column 1, line 13, strike out "caisson or"; same column 1, lines 15, 17, 27, 28, 33, 35 and 36, 39, 49, 51, 62, 63, 69 and 71, column 2, lines 5, 8, 18, 25, 26, 32, 34 and 36, column 3, lines 20, 25, 26, 33, 38, 39, 41 and 65, column 4, lines 5 and 6, 11, 7, 19, 28, 32, 50, 53, 57, 67 and 69, column 5, lines 15, 17, 20, 23, 28, 37 and 72, column 6, lines 2, 53, 56, 62 and 64, column 7, line 4, column 8, lines 9 and 10, column 9, lines 7, 8 and 51, column 10, line 40, column 11, lines 9, 14 and 17, column 12, lines 19, 20, 21, 23, 25, 47, 49, 54 and 75, column 13, lines 18, 49, 52, 71, 74 and 75, column 14, lines 9, 13, 36, 50, 65, 68, 70 and 71, column 16, lines 14, 23, 26, 29, 45, 63 and 69, column 17, lines 5, 10, 16, 27 and 38, column 18, lines 7, 23 and 37, for "caisson", each occurrence, read -- casing --; column 4, line 25 and column 17, lines 14 and 39, strike out "caisson", each occurrence.

Signed and sealed this 29th day of July 1969.

(SEAL)
Attest:

EDWARD M. FLETCHER, JR.
Attesting Officer                          WILLIAM E. SCHUYLER, JR.
                                                            Commissioner of Patents